United States Patent [19]

Card et al.

[11] Patent Number: 5,501,275

[45] Date of Patent: *Mar. 26, 1996

[54] CONTROL OF PARTICULATE FLOWBACK IN SUBTERRANEAN WELLS

[75] Inventors: Roger J. Card; Paul R. Howard; Jean-Pierre Feraud, all of Tulsa; Vernon G. Constien, Sperry, all of Okla.

[73] Assignee: Dowell, a division of Schlumberger Technology Corporation, Houston, Tex.

[ * ] Notice: The term of this patent shall not extend beyond the expiration date of Pat. No. 5,330,005.

[21] Appl. No.: 397,529

[22] Filed: Mar. 2, 1995

Related U.S. Application Data

[63] Continuation-in-part of Ser. No. 207,976, Mar. 8, 1994, Pat. No. 5,439,055, which is a continuation-in-part of Ser. No. 42,978, Apr. 5, 1993, Pat. No. 5,330,005.

[51] Int. Cl.$^6$ ............................................. E21B 43/267
[52] U.S. Cl. ........................ 166/280; 166/281; 166/292
[58] Field of Search ................................ 166/276, 278, 166/280, 281, 295, 292

[56] References Cited

U.S. PATENT DOCUMENTS

| | | | |
|---|---|---|---|
| 2,952,318 | 11/1953 | Ritch | 166/278 |
| 3,593,798 | 7/1971 | Darley | 166/295 |
| 3,854,533 | 12/1974 | Gurley et al. | 166/276 |
| 3,891,565 | 6/1975 | Colpoys | 166/278 X |
| 3,973,627 | 8/1976 | Hardy et al. | 166/276 |
| 4,109,721 | 8/1978 | Slusser | 166/280 |
| 4,527,627 | 7/1985 | Graham et al. | 166/280 |
| 4,623,021 | 11/1986 | Stowe | 166/250 |
| 4,665,988 | 5/1987 | Murphey et al. | 166/295 |
| 4,708,206 | 11/1987 | Jennings, Jr. | 166/281 |
| 4,875,525 | 10/1989 | Mana | 166/280 |
| 5,222,558 | 6/1993 | Montgomery et al. | 166/278 |
| 5,251,697 | 10/1993 | Shuler | 166/278 X |
| 5,330,005 | 7/1994 | Card et al. | 166/280 |
| 5,381,864 | 1/1995 | Nguyen et al. | 166/280 |

FOREIGN PATENT DOCUMENTS 2277112A 10/1994 United Kingdom.

OTHER PUBLICATIONS

J. G. Savins, "Drag Reducing Additives Improve Drilling Fluid Hydraulics," Oil & Gas Journal, Mar. 13, 1995.
W. D. McComb & K. T. J. Chan, "Drag Reduction In Fibre Suspension," Nature, vol. 292, Aug. 6, 1981.
W. D. McComb & K. T. J. Chan, "Drag Reduction In Fibre Suspensions: Transitional Behaviour Due to Fibre Degradation," Nature, vol. 280 Jul. 5, 1979.
A. B. Metzner, "Polymer Solution and Fiber Suspension Rheology and Their Relationship to Turbulent Drag Reduction," The Physics of Fluids, vol. 20, No. 10, Pt 11, Oct. 1977.
W. K. Lee, R. C. Vaseleski & A. B. Metzner, "Turbulent Drag Reduction in Polymeric Solutions Containing Suspended Fibers," AIChE Journal, vol. 20, No. 1, Jan. 1974.
R. C. Vaseleski & A. B. Metzner, "Drag Reduction in the Turbulent Flow of Fiber Suspensions," AIChE Journal, vol. 20, No. 2, Mar. 1974.
Peter F. W. Lee & Geoffrey G. Duffy, "Relationships Between Velocity Profiles and Drag Reduction in Turbulent Fiber Suspension Flow", AIChE Journal, vol. 22, No. 4, Jul. 1976.
D. D. Kale & A. B. Metzner, "Turbulent Drag Reduction in Fiber–Polymer System: Specificity Considerations", AIChE Journal, vol. 20, No. 6, Nov. 1974.
I. Radin, J. L. Zakin & G. K. Patterson, "Drag Reduction in Solid–Fluid Systems", AIChE Journal, vol. 21, No. 2, Mar. 1975.
M. S. Doulah, "Mechanism of Drag Reduction in Turbulent Pipe Flow by the Addition of Fibers", Ind.Eng.Chem.Fundam. 1981, 20, 101–102; 1981 American Chemical Society.
G. Hemstrom, K. Moller, & B. Norman, "Boundary Layer Studies in Pulp Suspension Flow,"Tappi/Aug. 1976 vol. 59, No. 8.
P. F. W. Lee & G. G. Duffy, "An Analysis of the Drag Reducing Regime of Pulp Suspension Flow," Tappi/Aug. 1976, vol. 59, No. 8.
G. V. Reddy & R. P. Singh, "Drag Reduction Effectiveness and Shear Stability of Polymer–Polymer and Polymer–Fibre Mixtures in Recirculatory Turbulent Flow of Water," Rheol Acta 24:296–311 (1985).
J. P. Malhotra, S. R. Deshmukh & R. P. Singh, "Turbulent Drag Reduction by Polymer–Fiber Mixtures," Journal of Applied Polymer Science, vol. 33, 2467–2478 (1987).
R. S. Sharma, V. Seshadri & R. C. Malhotra, "Drag Reduction in Dilute Fibre Suspensions: Some Mechanistic Aspects," Chemical Engineering Science vol. 34, pp. 703–713.
R. S. Sharma, V. Seshadri & R. C. Malhotra, "Drag Reduction by Centre–Line Injection of Fibres in a Polymeric Solution," The Chemical Engineering Journal, 18 (1979) 73–79.
M. T. Thew, J. S. Anand, "Characterising Asbestos Fibres Suitable For Drag Reduction," International Conference on Drag Reduction, 4th–6th Sep. 1974.
C. A. Parker & A. H. Hedley, "A Structural Basis for Drag–Reducing Agents," Journal of Applied Polymer Science, vol. 18, pp. 3403–3421 (1974).
H. Mizunuma & H. Kato, "Frictional Resistance in Fiber Suspensions", Bulletin of the JSME, vol. 26, No. 219, Sep. 1983.

(List continued on next page.)

*Primary Examiner*—George A. Suchfield
*Attorney, Agent, or Firm*—John E. Vick, Jr.

[57] ABSTRACT

The addition of fibrous mixtures in intimate mixtures with particulates for fracturing and gravel packing decreases or eliminates the undesirable flowback of proppant or formation fines while stabilizing the sand pack and lowering the demand for high polymer loadings in the placement fluids. Fibers are useful for forming a porous pack in the subterranean formation. In some cases, channels or fingers of void spaces with reduced concentrations of proppant may be introduced into the proppant pack.

14 Claims, No Drawings

OTHER PUBLICATIONS

D. D. Kale & A. B. Metzner, "Turbulent Drag Reduction in Fiber–Polymer Systems: Specificity Considerations", AIChE Journal vol. 20, No. 6, Nov. 1974.

P. F. W. Lee & G. G. Duffy, "Relationships Between Velocity Profiles and Drag Reduction in Turbulent Fiber Suspension Flow", AIChE Journal vol 22, No. 4, Jul. 1976.

R. C. Vaseleski & A. B. Metzner, "Drag Reduction in the Turbulent Flow of Fiber Suspensions", AIChE Journal vol. 20, No. 2, Mar. 1974.

I. Radin, J. L. Zakin, & G. K. Patterson, "Drag Reduction in Solid–Fluid Systems", AIChE Journal vol. 21, No. 2, Mar. 1975.

W. K. Lee, R. C. Vaseleski, and A. B. Metzner, "Turbulent Drag Reduction in Polymeric Solutions Containing Suspended Fibers", AIChE Journal (vol. 20, No. 1, Jan. 1974.

T. M. Nayberg & B. R. Petty, "Laboratory Study of Lost Circulation Materials for Use in Oil–Bse Drilling Muds"; SPE 14995.

P. Toma, R. W. King, P. Harris, K. N. Jha, G. Korpany, "Partial–Exclusion Sand Control Technique for Improving the Efficiency of Thermal Operations from Unconsolidated Heavy Oil Formations", SPE 21523.

R. M. Arenicz & R. N. Chowdhury, "Laboratory Investigation of Earth Walls Simultaneously Reinforced by Strips and Random Reinforcement"; American Society for Testing and Materials—1988.

CONTROL OF PARTICULATE FLOWBACK IN SUBTERRANEAN WELLS

CROSS REFERENCE TO RELATED APPLICATIONS

This application is a continuation in part of application Ser. No. 207,976, filed Mar. 8, 1994, (issued as U.S. Pat. No 5,439,055), which is a continuation-in-part of application Ser. No. 42,978, filed Apr. 5, 1993, issued as U.S. Pat. No. 5,330,005.

FIELD OF THE INVENTION

This invention relates to the recovery of hydrocarbons from subterranean wells. In this invention, a method, fluid, porous pack and system for controlling the transport of particulate solids back from the wellbore is provided. Fibers may be pumped downhole with proppant to form a porous pack that serves to inhibit the flow of solid particulates from the well, while still allowing the flow of hydrocarbons at reasonable rates. Other methods allow for selective formation of voids or channels within the porous pack, that facilitating well production while filtering undesirable materials that are not to be admitted into the wellbore.

BACKGROUND OF THE INVENTION

Transport of particulate solids during the production of oil or other fluid from a wellbore is a serious problem in the oil field, The problem arises because in extracting oil from underground it is necessary to facilitate a flowpath for the oil to allow the oil to reach the wellbore. The oil is then produced by allowing it to travel up the wellbore to the surface of the ground.

Transported particulate solids sometimes clog the wellbore, thereby limiting or completely stopping oil production. Such solids represent a significant wear factor in well production equipment, including the pumps and seals used in the recovery and pumping process. Particles present in the pumped fluid sometimes cause excess friction and greatly increase wear on sensitive portions of the fluid handling and production equipment. Finally, these particulate solids must be separated from the oil to render the oil commercially useful, adding even more expense and effort to the processing of oil.

Undesirable paticulate flowback materials that are transported in fluids flowing to the wellbore are particularly pronounced in unconsolidated formations. By "undesirable", it is meant that the flowback of the particle is undesirable. In some cases the particles flowed back may be proppant, which is desirable when in place in the formation (its intended function), but is not desirable if it flows out of the formation and up the wellbore. When that occurs, proppant particle becomes an undesirable contaminant because in that instance it acts to reduce, not increase, the production of oil from the well in an efficient manner.

In general, unconsolidated formations are those that are less structured, and therefore, more easily facilitate the uninhibited flow of fine particles. Further, particulates sometimes are located in the near wellbore area for reasons that are not simply based upon natural flow to such areas. In some cases, the presence of particulates is attributed to well treatments performed by the well operator that place particulate solids into the formation or the near wellbore area. Examples of such treatments are fracturing and gravel packing.

Numerous different methods have been attempted in an effort to find a solution to the problem of the undesirable flow of particulates. What has been needed in the industry is a method, material, or procedure that will act to limit or eliminate flowback of particulate materials placed into the formation in a fracturing process. Until the time of this invention, there was no satisfactory method of reducing or eliminating flowback.

One method employed in the past is a method of gradually releasing fracturing pressure once the fracturing operation has been completed so that fracture closure pressure of the formation rock acting against the proppant builds gradually. In this way, the method allows proppant the matrix to stabilize before fracturing fluid flowback and well production operates to carry significant quantities of the proppant out of the fractures and back to the wellbore.

Another method that has been employed in some instances to assist in reducing flowback of particulates is the use of so-called "resin-coated proppant", that is, particulate proppant materials having an adherent coating bonded to the outer surface of the proppant so that the proppant particles are bonded to each other. This process further reduces the magnitude of proppant flowback in some cases. However, there are significant limitations to the use of resin-coated proppant. For example, resin coated proppant is significantly more expensive than other proppant materials, which significantly limits it application to less economically viable wells.

Fracturing treatments may employ thousands or even millions of pounds of proppant in a single well or series of wells. Thus, the use of expensive, resin-coated proppants is generally limited by economics of well operation to only certain types of wells, or is sometimes limited to use in only the final stages of a fracturing treatment, sometimes known as the "tail" end of the fracturing job, or simply the "tail-in" of proppant near the end of the pumping job.

In unconsolidated formations, it is common to place a filtration bed of gravel in the near-wellbore area to present a physical barrier to the transport of unconsolidated formation fines with the production of wellbore fluids. Typically, such so-called "gravel packing operations" involve the pumping and placement of a quantity of gravel and/or sand having a mesh size between 10 and 60 U.S. Standard Sieve Series mesh into the unconsolidated formation adjacent to the wellbore. It is sometimes desirable to bind the gravel particles together to form a porous matrix for passage of formation fluids while facilitating the filtering out and retainment in the well of the bulk of the unconsolidated sand and/or fines transported to the near wellbore area by the formation fluids. The gravel particles may constitute a resin-coated gravel which is either pre-cured or can be cured by an overflush of a chemical binding agent once the gravel is in place. In some instances, various binding agents have been applied to the gravel particles to bind them together, forming a porous matrix.

Unfortunately, gravel packing is a costly and elaborate procedure that is to be avoided if possible. Further, some wellbores are not stable, and thus cannot be gravel packed. Further, gravel packing does not completely eliminate the production of fines particulates, and it is preferable to avoid the production of particulates without employing a gravel packing operation if possible. Gravel packing will not work in all instances.

Another recurring problem in pumping wellbore fluids is the enormous amounts of energy required to pump fluids containing large proppant concentrations at high rates for relatively long periods of time. Large amounts of energy are needed to overcome the great frictional forces between the proppant slurry and the interior of the tubular through which the slurry is being pumped. Above a certain threshold pressure, the fluid/proppant mixture cannot be pumped at all, because of the great frictional forces present at the liquid/tubular interface on the interior surface of the tubular or wellbore. The industry needs a viable solution to the problem of excess friction during pumping of proppant. Further, the industry needs a method or fluid that will inhibit production of particles, proppant and fines without substantially adversely effecting oil recovery from the wellbore.

SUMMARY OF THE INVENTION

The present invention provides a method, fluid, porous pack, and system for treating a subterranean formation. In one embodiment, it provides for formation of a porous solid pack that inhibits the flow of both deposited proppant and natural formation particulates and fines back through the wellbore with the production of formation fluids. In the practice of this invention, it is possible to build a porous pack within the formation that is comprised of fibers and proppant in intimate mixture.

This porous pack filters out unwanted particles, proppant and fines, while still allowing production of oil. In some cases, the porous pack may be selectively fitted with voids, or finger-shaped projections, sometimes called "channels". Such channels are located within the structure of the porous pack, and serve to provide a permeable barrier that retards flowback of particles, but still allows production of oil at sufficiently high rates.

It has been discovered that using fibers to make a porous pack of fibers and proppant within the formation also reduces the energy consumption of equipment, and makes it possible to fracture some wells that economically could not have justified fracturing without the added benefit of reduced friction pressure. It has been found that pumping fibers with proppant provides significant reductions in the frictional forces that otherwise limit the pumping of fluids containing proppant.

Furthermore, many well treatments that otherwise were cost prohibitive because of high energy requirements, or because pumping could not proceed at a sufficiently high rate to make the procedure justifiable, are now possible. Using the present invention, the ability of the fiber mixture to reduce the friction, thereby allowing faster pumping rates, facilitates job optimization.

A well treatment fluid is shown which comprises a fluid suspension including a simultaneous mixture of a particulate material and a fibrous material. The fibrous material may be selected from a group consisting of natural and synthetic organic fibers, glass fibers, ceramic fibers, carbon fibers, inorganic fibers and metal fibers and mixtures of these fibers.

In one aspect of the invention a means for inhibiting particulate transport in subterranean wells comprises a porous pack including a particulate material having a size ranging from about 10 to about 100 U.S. mesh in intimate mixture with a fibrous material.

It is therefore an object of this invention to provide a means and method whereby flowback of particulate materials either pumped into a wellbore with a well treatment fluid or present as a result of unconsolidated formation fines is prevented or inhibited by the presence of fibers in an intimate mixture with a particulate material. Further, such flowback may be prevented by a porous pack, the porous pack formed by flowing back the well at a relatively high rate, or perhaps by a chemical means.

Channels may be formed in the porous pack to selectively prohibit production of undesirable particles, while still allowing production of reservoir fluids, such as oil. This invention may also be used with resin coated proppants, without any fibers, to form channels in such proppant materials after they are deposited in an underground formation This is especially true in cases for which the cost of the resin coated materials is not a significant limiting economic factor. In some instances, resin coated materials may be used only as a tail-in at the end of the fracturing job, because of the relatively high cost of such resin materials.

It is yet another object of this invention to provide a means to control the flowback of particulate material in subterranean fluid production without the use of complicated and expensive resin formulations. In most cases, it is believed that use of a porous pack without resin coated proppants is less expensive.

DESCRIPTION OF THE PREFERRED EMBODIMENTS

In the treatment of subterranean formations, it is common to place particulate materials as a filter medium in the near wellbore area, or sometimes in fractures extending outward from the wellbore. In fracturing operations, proppant is carried into fractures created when hydraulic pressure is applied to these subterranean rock formations in amounts such that fractures are developed in the formation. Proppant suspended in a viscosified fracturing fluid is then carried out and away from the wellbore within the fractures (as the fractures are created) and extended with continued pumping. Ideally, upon release of pumping pressure, the proppant materials remain in the fractures, holding the separated rock faces in an open position forming a channel for flow of formation fluids back to the wellbore.

Proppant flowback is the transport of proppant sand back into the wellbore with the production of formation fluids following fracturing. This undesirable result causes several undesirable problems: (1) undue wear on production equipment, (2) the need for separation of solids from the produced fluids and (3) occasionally also decreases the efficiency of the fracturing operation since the proppant does not remain within the fracture and may limit the size of the created flow channel.

Currently, the primary means for addressing the proppant flowback problem is to employ resin-coated proppants, resin consolidation of the proppant or forced closure techniques. The cost of resin-coated proppant is high, and is therefore used only as a tail-in in the last five to twenty percent of the proppant sand placement. Resin-coated proppant is not always effective since there is some difficulty in placing it uniformly within the fractures and, additionally, the resin coating can have a deleterious effect on fracture conductivity. Resin coated proppant also undesirably interacts chemically with common fracturing fluid crosslinking systems such as guar or hydroxypropyl guar with organo-metallics or borate. This interaction results in altered crosslinking and break times for the fluids thereby affecting placement. Additionally, these chemicals can dissolve the coating on the resin-coated proppant making their use ineffective.

The difficulties of using resin-coated proppants are overcome in many instances by the present invention. Incorporating an amount of fibrous material in intimate mixture with conventional proppants solves many problems. The fibers act to bridge across constrictions and orifices in the proppant pack, and they serve to stabilize the proppant pack with no or minimal effect on proppant conductivity. While this invention is not to be limited by theory of operation, it appears that the fibers are dispersed within the sand and, at the onset of sand production from the fracture, the fibers become concentrated into a mat or other three-dimensional framework that holds the sand in place thereby limiting further proppant flowback with the fluid production.

As used in this specification, the term "intimate mixture" will be understood to mean a substantially uniform dispersion of components in a mixture. Similarly, the term "simultaneous mixture" will be understood to mean that the mixture components are blended in the initial steps of the process, i.e., prior to pumping.

Fiber length, thickness, density and concentration are important variables in the success of preventing proppant flowback. In accordance with the invention, the fiber length ranges upwardly from about 2 millimeters, fiber diameter ranges of from about 3 to about 200 microns. There appears to be no upper limit on the length of the fibers employed from the standpoint of stabilization. However, practical limitations of handling, mixing, and pumping equipment currently limit the practical use length of the fibers to about 100 millimeters. Fibrillated fibers can also be used and the diameters of the fibrils can be significantly smaller than the aforementioned fiber diameters. The fiber level used in the proppant pack can range from 0.01% to 50% by weight of the proppant sand. More preferably, the fiber concentration ranges from 0.1% to 5.0% by weight of proppant.

The modulus or stiffness of the fiber appears to be important in determining performance. Modulus is a measure of the resistance to deformation of a material and is a material property rather than a sample phenomena. Stiffness is a sample specific number which depends on both the material and its dimensions. As a general rule, fibers with a modulus of about 70 GN/sq. m or greater are preferred. This includes materials like E-glass, S-glass, AR-glass, boron, aramids, and graphitized carbon fibers. Organic polymers other than the aramides usually have relatively lower modulus values. In order for organic polymers, such as nylon, to be useful in this application larger diameter fibers are required to provide equivalent performance to that of E-glass and stiffer materials.

In the materials listed above, E-glass is a commercially available grade of glass fibers optimized for electrical applications, S-glass is used for strength applications and AR-glass has improved alkali resistance. These terms are common in the glass fiber industry and compositions of these types of glass are universally understood.

A wide range of dimensions are useful. Length and diameter have been discussed above. An aspect ratio (ratio of length to diameter) in excess of 300 is preferred. The fiber can have a variety of shapes ranging from simple round or oval cross-sectional areas to more complex trilobe, figure eight, star shaped, rectangular cross-sectional areas or the like.

Most commonly, straight fibers are used. Curved, crimped, spiral-shaped and other three dimensional fiber geometries are useful. Likewise, the fibers may be hooked on one or both ends. They may be of a composite structure, for example a glass fiber coated with resin to increase fiber-fiber adhesion.

The materials from which the fibers are formed is not a key variable provided that the fibers do not chemically interact with components of the well treatment fluids and are stable in the subterranean environment. Thus, the fibers may be of glass, ceramic, carbon, natural or synthetic polymers or metal filaments. Mixtures of these fibers may also be advantageously employed. Glass, carbon and synthetic polymers are preferred for their low cost and relative chemical stability. The density of the fibers used is preferably greater than one g/cm3 to avoid separation by flotation in the fluid/particulate slurry. Preferably, the fiber density is in the range of 1 to 4 grams per cc, closely mimicking the density of the particulate materials employed.

Glass fibers are particularly preferred due to their relatively low cost, easy availability and high stiffness. Because of the fact that placement fluids and subterranean formation fluids tend to have an alkaline pH, it is most preferred to use an alkaline resistant glass (hereinafter AR-glass) having a high zirconium content. The use of more common, commercially available silica glasses is possible within the scope of this invention but, the solubility of these glasses in an alkaline medium, particularly at elevated temperatures, may affect the long term stability of the fiber/proppant mixture over its lifetime in the wellbore.

Carbon fibers are preferred for use under harsh conditions. That is, under conditions in which the lifetime of glass fibers in the formation is limited. This may include wells with bottom hole temperatures above about 300 degrees F., steam injection wells, wells in formations in which the connate water is not silica saturated (such as limestone formations), wells which might be expected to be treated with acid, particularly hydrofluoric acid some time after the proppant/fiber mixture is put in place, and wells which involve high or low pH or corrosive environments.

Preferable, the carbon fibers should be at least partially graphitized, preferably more than about 90% graphitized, and more preferable more than 95% graphitized. The fibers may be comprised from pitch, polyacrylonitrile fibers or from novolac fibers by processes known to those familiar with the art. Examples of commercially available carbon fibers which are useful in this process include, but are not limited to, "Donacarbo" or "Donacardbo-S S335" from Donac Co., Ltd., T-125T carbon fibers from Kreha Corp. of America, "Dialead Carbon Fibers " from Mitsubishi Kasei Corp. and "Panex carbon fibers " from Zoltek Corporation.

A number of different proppants can be used in this invention. Sized sand and synthetic inorganic proppants are the most common. Examples include 40/60 sized sand, 20/40 sized sand, 16/20 sized sand, 12/20 sized sand, 8/12 sized sand and similarly sized ceramic proppants such as "CARBOLITE™" proppants.

The proppant can be resin coated sand or ceramic proppant. Resin coated sand is used in some cases as a substitute for more expensive ceramic proppants because both are claimed to be more crush resistant than sand. The addition of fibers would aid in the control of proppant flowback or serve the other purposes described herein.

The combination of resin coated sand and fibers would provide a stronger pack than either system alone. This may be useful in itself. In addition, the fibers could allow use of more highly precured resin coated proppants thereby minimizing the deleterious interaction of curable resin coated proppant with typical fracturing fluid components.

The preferred job execution practice is to mix the fibrous material throughout the entire batch of proppant to be pumped during the job. This may be accomplished by adding the fiber to the proppant before it is mixed with the fluid, adding the fiber to the fluid before it is mixed with the proppant or by adding a slurry of fibers at some other stage, preferably before the slurry is pumped downhole.

In certain cases, it may be preferred to pump the slurry of proppant and fiber only during a portion of the job, for example as the last 10–25% of the proppant into the fracture as a "tail-in" to control flow back in the most economical manner or for other reasons. The slug could also be pumped at other stages, for example to provide an absorbed scale inhibitor to be pumped to the front of the fracture.

In certain cases, it may be desired to pump small slugs of the slurry of proppant and fiber in between slugs of slurry of proppant or to pump small slugs of a slurry of fiber between slugs of proppant slurry. This could conceivably be used to control flow dynamics down the fracture, for example by providing more plugflow-like behavior. Pumping of small slugs of slurry of fiber as the tail-in is one example of this general procedure.

The slurry of a mixture of proppant and fibers is useful for various reasons in the entire range of reservoir applications from fracturing to sand control. This especially includes the newer technologies of frac-and-sand-pack and high permeability stimulation. In these applications formation permeabilities are typically higher than those for classical fracturing, extending into the 10 md to 2 darcy range. As a result, the fractures are shorter (e.g. 10–200 ft) and wider (e.g. ½-2 inches) than classical fractures. Control of flowback of proppant on these types of jobs can reduce or eliminate the need for costly hardware such as gravel pack screens in the hole and simplify job design.

The selection of fiber can be based on chemical as 20 well as physical reasons. For example, in gravel packing and related applications where it is anticipated that the resulting pack-in-place will be treated with acid mixtures containing hydrofluoric acid, carbon fibers will be preferred over glass fibers when long life 0f the fibers is desired. Further, such treatments can provide channels in the porous pack that serve to facilitate the filtering action of the proppant pack, as further described below.

The opposite may also be desired. Use of carbon fibers through the first 90% or so of the job followed by glass fibers in the tail-in would result in a pack which could be treated with solutions of hydrofluoric acid to dissolve the glass, allow flowback of a small portion of the sand at the face of the fracture and improve well productivity. Pumping alternate slugs of proppant/fiber slurries containing the different fibers could be followed by treatment with acid to produce fracture with high permeability zones (where the glass fibers were) but with stable proppant/fiber pack zones (where the carbon fibers were) to keep the fracture open. Further, in some cases acid treatment can provide channels, or voids, in the porous pack. These voids are regions wherein the proppant is removed from the porous pack. The treatment of the porous pack may sometimes result in formation of one or more "finger" shaped projections to traverse the porous pack.

Beyond the advantages of avoiding proppant flowback, additional advantages have been noted in the use of fibrous materials in the well treatment fluid. First, the presence of fibers advantageously has been found to reduce the friction encountered by the fluid in the tubular, thereby saving energy and making it possible to pump jobs that otherwise would not be economical. This is described in greater detail below.

The presence of fibers in the fluid also slows the settling rate of the solid materials in the fluid thereby permitting the use of lesser amounts of polymeric gelling material in the placement fluid. This feature offers the advantages of less cost, greater retained permeability, a need for lower concentrations of breaker and avoidance of chemical interaction with the treatment fluid components.

The fluid loss properties of the fibers are also available when fibers are incorporated into a proppant carrying fracturing fluid. In areas of high fluid loss, the fibers and sand will concentrate into a mat thereby limiting additional fluid loss in these areas.

Fibers also offer an opportunity to place well treatment chemicals in a dispersed form within the proppant pack. Thus, porous or hollow or dissolvable fibers can be filled or formed with various materials such as polymer breakers, scale inhibitors, and/or paraffin and asphaltene inhibitors which can be slowly released within the pack.

The materials from which the fibers are formed is not a key variable, provided that any chemical interaction between the fibers and the components of the well treatment fluids do not dramatically decrease the ability of the fibers to perform the desired function. In some cases, the desired function may actually require chemical interaction with well treatment fluids.

The exact mechanism of the greatly reduced friction that may be achieved while pumping fibers and proppant in connection with the practice of this invention is not readily determinable. Nevertheless, without limiting this invention in any way, it is believed that proppant, during pumping in a fluid within a tubular, generally tends to align along the center of a tubular, and that fact tends to provide a destabilized fluid flow, causing greater frictional forces. When pumped with sufficient amounts of fiber, however, the proppant/fiber mixture exhibits reduced friction, apparently because the mixture stabilizes the proppant across a larger cross-sectional area of the tubing, rather than merely along the center of the tubing. This results in formation of a lubricating thin water layer at the pipe wall surface, facilitating decreased friction pressure.

Fiber may be used to design complex flow channels in the proppant pack. For example, a fracturing job may be engineered such that voids or channels (sometimes called "fingers") of proppant flow out of the proppant pack after the pack is formed downhole, resulting in the creation of open channels which allow well-fluids to flow into the wellbore without substantial restriction. Of course, the proppant pack still provides an effective barrier to particles, proppant or fines that otherwise would flood into the wellbore.

These fingers may range in length from about one inch to several feet, or maybe-even longer. They may be created in a number of ways. For example, the well can be flowed back at a rate sufficient to create channels without loss of the majority of the proppant pack. A glass fiber proppant pack, which utilizes glass fibers, may be treated with mud acid(an aqueous solution of hydrochloric acid and hydrofluoric acid) under matrix conditions to dissolve the glass fibers within the porous pack in finger-like patterns. This may be accomplished at treating pressures less than that required to fracture the formation. When the well is allowed to flow, the proppant will be produced back from those finger-like areas which no longer contain any fibers.

This type of process, or others, results in the selective creation of a customized pack-in-place Wherein the pack contains a series of concentrations of fiber/proppant mixtures. For example, the majority of the fracture could be packed with a proppant pack containing, for example, 1.5% fibers as a total fiber/proppant mixture by weight. During the final tail-in at the end of the fracturing job (such as during the last 1–15% of the total proppant placed in the well) the amount of fibers could be decreased such that some lower level of fiber concentration, e.g. 1% fibers could be utilized.

In general, pack stability to flow decreases with decreasing fiber concentration. In other words, the more fiber, the stronger the pack in general. Using this invention, the zone closest to the wellbore could develop open fingers while the rest of the pack remains stable. In another example, the majority of the pack could consist of a carbon fiber proppant pack and the tail-in could consist of a glass fiber proppant pack. In that instance, treatment with mud acid or other hydrofluoric acid containing solution or solvent would dissolve some of the glass fibers and produce fingers in that area which will not extend into the areas containing carbon fibers (because carbon is not believed to be soluble in hydrofluoric acid).

In a similar manner, channels can be created in porous packs of resin coated proppant and fiber, or under certain conditions even without fibers. Acid treatment can remove the resin coating on resin coated proppant after it is in place in the formation. In that instance it is possible to decrease the flow resistance of that portion of the pack, allowing it to destabilize and proceed out of the pack, thereby allowing fingers to form. In the presence of fibers, acid treatment may be provided shortly after fracturing. With resin coated proppants, the acid treatment could occur only after the resin coated proppant has been allowed to cure properly.

The use of acid resistant fibers, such as carbon, also allows formations to be treated with acids after the fiber/proppant pack is in place. In that instance, the acid treatments most likely could dissolve the glass fibers in a matter of minutes to hours.

The use of fibers may reduce costs in comparison to, for example, using resin coated proppants because the use of fibers does not require extended cure times as usually is necessary in applications using resin coated proppant. Further, fibers can be advantageously used where multizone formations with low bottom hole temperatures require a long shut in time between fracturing each formation to allow resin coated proppant to cure. The long cure times associated with such formations may be substantially avoided by using fibers, so that no shut in time is required, and several zones may be fractured in a single day. In this case, the cost saving will vary depending upon the number of zones to be fractured, and the required shut in times. In some cases, this will result in the ability to fracture a well in one day, rather than over a period of about one week. This is a substantial reduction, and it reduces cost and reduces shut in time for the well, which is costly in terms of lost production.

Using resin coated proppant could be accomplished by shutting in the well to cure, followed by a pumping of viscosified of fluid having a mobility ratio at downhole conditions of at least 50/1 greater than the following fluid that would be injected at less than fracturing rates. This fluid could be gelled brines, but could also be a gelled oil. Following the viscosified fluid, a solution of regular mud acid containing a mutual solvent such as U66 brand mud acid (U66 is believed to be a registered trademark) or butyl acetate could be applied in a strength of about 10%. This fluid might be allowed to flow into the viscosifying fluid to react with and remove the viscosified consolidation resin within the channel or finger. The shut in time would be based on the type of resin used for consolidation. It is anticipated that some resin systems would be more favorable than others for this application. The well would then be produced at a rate that would produce the now unconsolidated proppant out of the created channels. This cleanout process could be assisted in some cases in low pressure wells by injecting nitrogen or carbon dioxide and rapidly pumping the well back to create the conductivity enhancing channels or fingers.

In some applications, the fibrous material need not be fibers, but could be platelet type materials which increase the cohesion of the proppant in place. Such platelet materials may increase the cohesion of the proppant and minimize the amount of proppant flowback when the well is produced. The platelets could be used in the full procedure of the fracturing job, or as a tail-in. In one application, the platelet materials could be mixed with gravel at the same vertical level, wherein the gravel is used in sand control. The platelets in that instance would prevent the gravel placed outside the wellbore from flowing back with the produced fluids, eliminating the need for a screen in the wellbore. Platelets may be comprised of a wide variety of materials, including discs or shavings of metal, polymers, ceramics, glass, or other naturally occurring materials. Preferable, the approximate size of platelets would be larger than 0.6 mm in the longest dimension.

The fluids to be used in as a transport medium for the fluid suspension are not believed to be a critical factor in the practice of the invention. In general, commonly used fluids may be utilized, such as water based fluids and oil based fluids (foamed or not foamed). The preferred fluid will vary depending upon the particular requirements of each well.

The following examples will illustrate several formulations incorporating fibers. It will be understood that the presentation of these examples is solely for the purpose of illustrating the invention and should not be considered in any way a limitation on the scope or applicability of the concept of the present invention.

EXAMPLE 1

(CONTROL):

The leakoff rate of a borate-crosslinked guar fracturing fluid was determined in the following manner: A fracturing fluid was prepared from synthetic seawater containing 30 lb/1000 gal of a polymer slurry, 1.0 gal/1000 gal surfactant, 0.5 gal/1000 gal bactericide and 0.25 gal/1000 gal antifoaming agent. Approximately 2000 ml of this fluid was crosslinked with a borate crosslinking agent, poured into a large baroid cell and heated to 200° F. for 30 minutes. Using 1000 psi pressure, a fluid leakoff test was performed with a one inch sandstone core having a low permeability (0.5 millidarcy). Results are presented in Table A.

EXAMPLES 2–5

In a manner similar to example 1, the behavior of fiber/fracturing fluid mixtures were determined. All tests were performed identical to example 1 but included 2.0 g of glass fibers. (½" long and 16 microns in diameter) that were added to the fluid prior to crosslinking. Other modifications to example 1 were:

Example 2 contains 30 lb/1000 gal of a polymer slurry.

Example 3 contains 25 lb/1000 gal of a polymer slurry.

Example 4 was prepared using 2% KCl tap water, 30 lb/1000 gal polymer slurry, 1.0 gal/1000 gal surfactant, 0.5 gal/1000 gal bactericide and 0.25 gal/1000 gal antifoaming agent. No crosslinker was added to the system.

Example 5 is identical to Example 3 but a sandstone core having a permeability of 100 millidarcy was used.

The data are presented in Table A. These data demonstrate that the fibers dramatically decrease the leakoff rate under fracturing conditions.

TABLE A

LEAKOFF VOLUMES AS A FUNCTION OF TIME

|  | EX. 1 | EX. 2 | EX. 3 | EX. 4 | EX. 5 |
|---|---|---|---|---|---|
| 1 min. | 0.4 ml | 0.3 ml | 0.6 ml | 0.8 ml | 6.6 ml |
| 4 min. | 1.2 ml | 0.6 ml | 0.9 ml | 1.0 ml | 7.6 ml |
| 9 min. | 2.1 ml | 0.6 ml | 1.1 ml | 1.7 ml | 8.2 ml |
| 16 min. | 2.9 ml | 0.6 ml | 1.1 ml | 2.2 ml | 8.8 ml |
| 25 min. | 3.6 ml | 0.6 ml | 1.4 ml | 2.7 ml | 9.4 ml |
| 36 min. | 4.4 ml | 0.6 ml | 1.5 ml | 3.1 ml | 10.1 ml |

EXAMPLE 6

(CONTROL)

The leakoff rate of a particulate carrying fluid was measured. The fluid contained tap water and 80 lb/1000 gal. of hydroxyethylcellulose. The particulate was a sized calcium carbonate (1–500 microns) which was added at a concentration of 0.5 lbs/gallon of fluid. Approximately 250 mls of this fluid was blended and added to a large baroid fluid loss cell preheated to 175° F. After 15 minutes, 500 psi of nitrogen pressure was applied to force the fluid against a one inch sandstone core having a permeability of 250 millidarcy. Results are presented in Table B.

EXAMPLES 7–10

The tests were repeated using glass fibers alone and in combination with the calcium carbonate particulate material. The particle loading remained constant at 0.5 lbs/gallon of fluid. The fibers were added to the fluid at the time of the calcium carbonate addition. The fiber was added as a function of weight percent of the initial calcium carbonate material.

Example 6: 100% Calcium Carbonate; 0% Fiber

Example 7: 99% Calcium Carbonate; 1% Fiber

Example 8: 95% Calcium Carbonate; 5% Fiber

Example 9: 90% Calcium Carbonate; 10% Fiber

Example 10: 0% Calcium Carbonate; 100% Fiber

TABLE B

LEAKOFF VOLUMES AS A FUNCTION OF TIME

| TIME | EX. 6 | EX. 7 | EX. 8 | EX. 9 | EX. 10 |
|---|---|---|---|---|---|
| 0 | 0 | 0 | 0 | 0 | 0 |
| 1 min. | 110 | 87 | 76 | 171 | 30-½ |
| 4 min. | 117 | 90 | 79 | 174 | 31 |
| 9 min. | 118 | 93 | 81 | 175 | 31-½ |
| 16 min. | 119 | 94 | 83 | 176 | 37 |
| 25 min. | 118 | 94 | 83 | 176 | 37 |
| 36 min. | 118 | 94 | 83 | 176 | 38 |

Example 10 (fibers alone) showed no migration into the core. Particulate systems (Example 6) always show some migration into the core.

The data demonstrate superior leakoff control by the fibers. An additional advantage of fibers is no particulate migration into gravel pack or formation, therefore, less damage.

The following examples illustrate the ability of fibrillated fibers to stabilize proppant packs:

EXAMPLE 11

(CONTROL):

200 grams 20/40 mesh sand in 105 ml aqueous guar solution was poured into a 25 mm diameter glass column fitted with a bottom valve. Permeability of the pack was 380 darcies. The sand readily flowed through the ⅛ inch diameter valve when it was opened.

EXAMPLE 12

In a similar manner, the Example 11 was repeated but 2 g polyacrylonitrile fibrillated fiber was mixed with the same slurry before it was poured into the column. The pack permeability was 120 darcies. The pack did not flow out when the valve was opened. It was also stable when the valve was completely removed leaving a ¼ inch diameter hole directly under the sand pack.

This illustrates the ability of fibrillated fibers to consolidate a sand pack.

EXAMPLE 13

Fibers Stabilize Sand Pack: A 30 lb/1000 gallon uncrosslinked guar solution was made. The composition of this fluid was the same as in Example 1. Fifty ml of this fluid were mixed with 0.8 grams of 12 mm long, 16 micron diameter glass fibers. They were mixed with a Hamilton Beach stirrer at low speed for 15 seconds. 100 grams of 20/40 proppant sand were added to the mixture and mixed by hand in a closed 4 oz. jar by gentle shaking. The resulting mixture was poured into a vertical glass column 12 mm in diameter with a "T" section at the bottom. The left end of the "T" had a screen installed and the right end did not. First, water was flowed down the column and out the left side of the "T" to clean the guar from the sand/fiber and make a pack. The permeability of the pack was then measured. It was 278 darcies.

Next, the water flowed left to right across the "T". This washed the sand and fiber from the "T" section. The sand/fiber pack in the column section remained stable.

The water direction was then changed to flow down the column and out the right side of the "T". This created a pressure drop across the sand/fiber pack, and no screen prevented the sand from moving with the flow. The pressure drop was increased (by increasing the flow rate) until the sand/fiber pack failed and flowed out of the vertical section of the column. The pressure drop across the sand/fiber pack required to do this was in excess of 275 kPa (40 psi). Almost none of the sand in the sand/fiber pack flowed out of the vertical section of the column until the sand pack "failed."

EXAMPLE 14

A 30 lb/1000 uncrosslinked guar solution was mixed with the proppant sand (50 ml solution with 100 grams sand) following the same procedure as in Example 13 but WITHOUT the fiber. This mixture was put into the column and the guar was cleaned out of the sand pack in the same manner as in Example 13. The permeability of the sand pack was 250 darcies. The sand pack failed under an unmeasurably low pressure.

These examples (13 and 14) illustrate that mixing fibers with the proppant sand caused the formation of a stable pack in the column. The fibers held the sand in place against a much higher force (pressure) than the sand without fibers. Also, the fibers had a negligible effect on the permeability of the sand pack.

EXAMPLE 15

Nylon Fibers:

Fifty ml of a 30 lb/1000 gallon guar solution were mixed with 0.2 grams of 20 mm long, 64 micron diameter, nylon polyamide fibers. The mixing was done in a similar manner to that of Example 13. This mixture was poured into the column and tested
as described in Example 13. The permeability of the sand/fiber pack was 200 darcies. The sand/fiber pack failed at a drawdown pressure across the pack of 265 kPa.

EXAMPLE 16

Sand Pack Stabilization With High Viscosity Fluids.

1 gram of 32 mm long, 16 micron diameter glass fiber was mixed with a solution of corn syrup and water having a viscosity of 600 centipoise. The mixing was done in a Hamilton Beach stirrer at low speed for 10 seconds. 100 grams of 20/40 proppant sand was then mixed with the fiber and solution. The mixture was poured into the column described in Example 13. In this case, the 600 centipoise corn syrup solution was flowed through the column. The sand/fiber pack permeability was 352 darcies. The pressure drop across the sand/fiber pack was increased with the flow direction out of the right side of the "T" (no screen). The pressure drop across the sand pack was raised to 400 kPa without pack failure.

This example illustrates that the fibers cause the sand pack to be stable even with high viscosity fluids flowing through them. High viscosity fluids flowing through the sand would occur if a guar gel was flowed back through the fracture during clean-up.

EXAMPLE 17

Settling:

A 30 lb/1000 gallon guar/borate crosslinked gel was made. The composition was that of the guar solution in Example 13. 12 mm, 16 micron diameter glass fibers (0.8 weight % of sand) and 20/40 proppant sand were added to a quantity of the gel such that the sand concentration was 10 lb/gallon of gel. The sand and fiber were added to the guar solution prior the gel crosslinker solution. The fiber was added to the solution, and dispersed with a Hamilton Beach mixer. This was added to the sand in a closed Jar and gently mixed by shaking. The composition of the crosslinker solution was 0.3 grams boric acid, 0.6 grams sodium hydroxide, 1.2 grams sodium gluconate, 0.5 ml triethanol amine, and 0.6 grams sodium thiosulfate for 500 ml of guar solution. The resulting mixture was placed in a heated closed column and further mixed by inverting the column once per minute. The mixture was heating to 66 degrees Celsius and the column was oriented in the vertical. The mixture ran to the bottom of the column. The settling of the sand and fiber in the guar gel were observed as a function of time at 66 degrees Celsius. Percent settling was calculated as follows:
% settling=100×(total height-sand height)/maximum liquid height.

Total height is the height of sand plus gel liquid. Sand height is the height of the top of the sand layer. Maximum liquid height is determined with sand and water in the same amounts.

After 315 minutes the settling for the sand and fiber was 17%. There was no tendency of the sand and fibers to phase separate during the settling.

EXAMPLE 18

The experiment of Example 17 was repeated with 1.3% of the glass fiber based on the sand weight. In this case, after 260 minutes the settling was 14%.

EXAMPLE 19

The sand alone in the fluid of Example 17 settled 60% in 300 minutes. By comparison with Examples 17 and 18, this example shows that the glass fibers reduce the settling rate of the sand in the gel.

EXAMPLE 20

Interaction with Borate Gel:

Six liters of a 30 lb/1000 gallon uncrosslinked guar solution were mixed with 47.6 gram of 12 mm long, 16 micron diameter glass fibers. The fiber level was based on 8 lb/gallon sand loading. No sand was added to the fiber/solution mixture. The fiber/solution mixture was allowed to sit approximately one half hour after mixing. Two fifty ml samples were removed. The fibers were filtered from one of the fifty ml samples. The Fann35 viscosity of each sample was measured at 70 degrees F. The sample with fibers had viscosities of 51 and 30 cp. at 170 and 510 $sec^{-1}$ rate respectively. The filtered sample had viscosities of 42 and 24 cp respectively. The viscosities of the filtered sample were well within specifications for this guar solution. The solution with fibers had a slightly higher viscosity.

Next borate crosslinker solution (composition in Example 17) was added to both solutions. The time to gelling was measured for both by "hang lip" methods. The filtered solution had a "hang lip" time of 4 minutes, 44 seconds. The sample with fiber had a "hang lip" time of 4 minutes 27 seconds. Both these crosslinking times are within specifications for these guar gels.

This example illustrates that the preferred glass fibers do not affect the viscosity and the "hang lip" gel times of the borate crosslinked guar gel. This illustrates that the glass fibers do not affect the guar gel chemistry or viscosity significantly.

EXAMPLE 21

Interaction With Zirconate Gel:

The same mixing procedure as in Example 20 was followed with a 50 lb/1000 gallon hydroxypropyl guar solution. The 12 mm glass fibers were added to, then filtered out of one aliquot of the solution. This aliquot and another aliquot that had not been exposed to the fibers were crosslinked with a 4.5 lb/1000 gallon zirconium solution. The solution was 40% zirconium crosslinker, 24% high temperature stabilizer, and 36% water. Crosslinking hang lip times were 9:19 minutes for the sample not exposed to the fibers, and 10:13 minutes for the sample exposed to the fibers. Again, the fibers do not affect the crosslinked gel chemistry.

EXAMPLE 22

Conductivity.

Conductivity testing was done with 20/40 mesh proppant. The fluid was a 30 lb/1000 gallon uncrosslinked guar solution. The composition was 17 ml of 2% KCl water, 0.12 ml guar slurry, 0.02 ml fluorocarbon surfactant, and 0.005 ml defoamer. The fluid was mixed with 63 grams of 20/40 proppant. The test was done in a conductivity cell at 250° F. and 5000 psi closure stress. The conductivity after 23 hours of flowback was 157 darcies.

The test was repeated with the same quantities of fluid and proppant. In addition, 0.5 grams (0.8%) of 12 mm long, 16 micron diameter glass fibers were mixed with the proppant and fluid. The conductivity after 24 hours of flowback was 153 darcies.

This example illustrates that the fibers have a negligible effect on proppant pack permeability.

EXAMPLE 23

Slot Flow.

The fiber/sand pack stability was tested in a slot geometry. 5 liters of 30 lb/1000 gallon uncrosslinked guar solution were made (34 ml guar slurry, 5 ml surfactant, and 1.25 ml defoamer and 5000 ml of tap water). This was mixed by recirculating the fluid through a holding tank and centrifuge pump for 15 minutes. 5000 grams of 20/40 sand was then added and allowed to disperse for approximately 1 minute. 50 grams of 12 mm long, 16 micron diameter glass fiber were added to the mixture. The resulting slurry was pumped into the slot.

The slot is approximately 5-½ feet long, ¼" wide and 6" high. The surfaces are smooth, with the front surface being clear to allow observation. A screen was placed over the exit port so that the sand could not flow out of the slot. The slurry was pumped into the slot from the other end. In this geometry, a pack of sand and fibers built up against the screen, while the fluid was allowed to flow through the screen to a holding tank. A 6"long sand/fiber pack was built up against the screen.

The guar fluid was then washed from the pack with water. The screen was removed from the end of the slot, leaving the pack with an open ¼"×6" face. Water was flowed through the pack to test its strength. The water flow was increased until a 6 psi pressure drop was supported by the pack. At this point the pack began to fail and sand flowed out of the slot.

EXAMPLE 24

Slot Flow, Rough walls, Glass fibers:

The same slurry as in Example 23 was again tested in the slot geometry. In this example, the walls of the slot were roughened. This was done by adhering a layer of 20/40 sand to the walls of the slot with rubber cement. In this geometry, a 22" sand/fiber pack was obtained and the strength of the pack exceeded 15 psi drawdown (upper limit on pump).

EXAMPLE 25

Slot With Gas Flow:

A similar slurry as used in Example 23 was used in this example. In this example we used a 10 lb/1000 gallon guar solution. This slurry was pumped into the slot with rough walls and the screen as described in Example 24. The guar solution was washed from the sand/fiber pack with water. Then the pack was dried with air flowing through it for 3-½ hours. The screen was removed and the test for pack strength was performed. The pack length was 18". The air flow rate was increased to 13 psi drawdown across the pack. The pack did not fail.

The pack was then further dried at low air flow rate for an additional two hours. The test was repeated. The sand/fiber pack did not fail with flow up to an 11 psi drawdown across the pack.

This example illustrates that the sand/fiber pack is resistant to gas flows as well as water flows.

EXAMPLE 26

Slot Flow With ½" aramide fibers: "KEVLAR™" polyaramide fibers were tested in the slot geometry with rough walls. The fluid was a 20 lb/1000 gallon uncrosslinked guar solution similar to Example 23. The aramide fibers were 12 mm long and 12 microns in diameter. The slurry mixture was 4 liters of fluid, 4 kg of 20/40 proppant sand, and 12 grams of "KEVLAR" fiber (0.3 wt. % of sand).

The sand/fiber slurry was pumped into the rough walled slot with the screen at one end as was described in Examples 23 and 24. The resulting sand pack was 14.5" long. The fluid was washed from the sand fiber pack with water. The screen was removed and the water was again flowed through the pack. The pack began to fail at 3 psi drawdown.

EXAMPLE 27

Slot Flow, 1" Nylon Fibers:

We tested 1" long nylon fibers in the rough walled slot. The fibers were 64 microns in diameter. The slurry was 5 liters of 30 lb/1000 gallon uncrosslinked guar solution, 5 Kg of 20/40 proppant sand, and 15 grams of nylon fiber. The sand/fiber pack length was 6". The pack began to fail at less than 1 psi drawdown.

Examples 23–27 illustrate that fibers stabilize a proppant pack in a fracturing geometry even with smooth walls and no closure stress.

EXAMPLE 28

Slot Flow:

The fiber sand pack strength was tested. A 30 lb/1000 gallon uncrosslinked guar solution with the same composition as Example 23 except that 2% KCl water was used. 20/40 proppant was added to the fluid at 12 pounds per gallon. 12 mm long, 16 micron diameter glass fibers were also added at 1% of the proppant level.

The slurry was loaded into a 5-¼" by 5-¼" by ¼ slot. The walls of the slot were lined with Springwall sandstone. A closure stress of 250 psi was applied. The cell was heated to 210° F. The fluid was washed from the gel with a 1% KCl solution flowing at a slow rate (50ml/min). The brine was then washed from the cell with a saturated nitrogen gas flow. The cell was then heated to 225° F. The test was no performed with the nitrogen flow at increasing drawdown across the pack. The pack was stable at 20 psi/ft. with a closure stress ranging from 100 to 200 psi.

EXAMPLE 29

Slot Flow, NO FIBERS:

The same experiment as in Example 28 was performed with proppant without fibers. At 250 psi closure stress, ¼" slot, 225° F. the proppant pack failed at less than 0.2 psi/ft.

These examples demonstrate the ability of fibers to stabilize a proppant pack under representative downhole conditions.

EXAMPLE 30

Yard Test:

The glass fibers were tested in a yard test. The 12 mm long, 16 micron diameter glass fibers were added at a 1% level to the sand in a simulated fracture Job. The fibers were added by hand into a fracturing fluid blender with the 20/40 proppant. This mixture was combined with the 30 lb/1000 gallon crosslinked fracturing fluid in the blender. It then flowed through a triplex pump, a tree saver, a variable choke with 1000 psi drawdown, and 300 yards of 3 inch pipe.

The pumping schedule was:

1 ppg proppant at 6 bbls/min.

1.5 ppg proppant at 6 bbls/min.

2 ppg proppant at 6 bbls/min.

3 ppg proppant at 8 bbls/min.

4 ppg proppant at 8 bbls/min.

Samples of the mixture were taken at the exit of the pipe. The glass fibers were well mixed with the proppant and fluid, although some fiber breakage was apparent.

The example demonstrates that fiber/sand slurries can be pumped with conventional pumping equipment and that the fibers are stable enough to survive this treatment.

EXAMPLE 31

Perforation Packing:

The ability of fibers to keep sand in a reservoir over a ¼" perforation was tested. A model perforation ¼" in diameter and 3"long with a 75 cubic inch reservoir at the outlet was used for the tests. The reservoir was equipped with a 20 mesh screen at the other side from the perforation. Slurry could then flow into the reservoir through the perforation and out through the screen. 4.5 L of a 20 lbin/1000 gal/hydroxyethyl cellulose (HEC) solution was prepared (135 g $NH_4Cl$ (3 wt%), 28.3 mL HEC solution and dry caustic to raise the pH to 8). This was mixed by recirculating the fluid through a holding tank and a centrifuge pump. The fluid was hydrated for ca. 30 min. 13.5 g Aramide staple, ½" long, was mixed in and 2,696.5 g 20/40 sand were added to the mixture (5 lbm/gal proppant, 0.5 wt % fiber based on the proppant). The resulting slurry was pumped into the reservoir through the ¼" perforation. A pack of sand and fibers built up against the screen, while the fluid was allowed to flow through the screen into the holding tank.

After packing the performation, the lines, the holding tank and the pump were cleaned and filled with water. The flow direction, was reversed and water was pumped from the screen side through the packed perforation. No proppant was produced through the ¼" hole even by increasing the flow rate till a pressure drop across the pack of 15 psi was reached and kept for several minutes. The water flow was turned off and on several times. That did not produce sand either.

EXAMPLE 32

The same perforation was packed with 20/40 sand and 12 mm long, 16 micron diameter glass fiber using a 30 lbm/1000 gallon uncrosslinked guar solution. 4.5 L fluid were prepared (90 g KCl (2 wt %), 4.5 mL surfactant, 1.125 mL defoamer, 30.6 mL guar slurry) and hydrated for 30 min. 27 g glass fiber were added and after one minute 2,700 g 20/40 proppant (5 lbm/gal, 1 wt% fiber based on proppant). The packing and water flow were done as in Example 31, The packed perforation was kept for 10 days. Within this time water was flown through it ca. 5 times, each time turning the pump on and off several times. The pack was stable and produced one teaspoon proppant at the most.

EXAMPLE 33

The same setup as in Example 31 except for a ½" perforation. This time polypropylene fibers (½" long, 4 denier) and 30 lbm/1000 gal HEC were used. Fluid: 4.5 L.

135 g $NH_4Cl$, 42.5 mL HEC solution, caustic to raise the pH to 8.

Proppant: 2,696.5 g 20/40 sand (5 lbm/gal)

Fiber: 27 g polypropylene, ½" long, 4 denier (1 wt % based on proppant)

Packing and flowing water through the above worked well, and no sand production was encountered even over ½" hole.

Examples 31 through 33 illustrate that different types of fibers may be used to hold sand in place in the formation beyond the perforation tunnels. This is applicable to gravel packing, where gravel is placed outside of the perforations to stabilize subterranean formation sands.

EXAMPLE 34

Stabilization of Different Types of Proppant:

Column experiments were performed using the fluid composition (30 lb/1000 gallon guar solution), and procedure as in Example 13. 50 ml aliquots of fluid were mixed with 100 grams each Of various proppants and 1 gram (or 1.6 grams) each of 12 mm long, 16b micron diameter glass fibers. The proppants were 20/40 "CARBOLITE™", 20/40 "ACFRAC SB ULTRA™" curable resin coated sand, and 20/40 "ISOPAC™" light weight gravel. The "CARBOLITE" proppant has approximately the same density as sand, but is more spherical. The "SB ULTRA" has approximately the same density and sphericity as sand, but has a polymer coating. The "ISOPAC" lightweight gravel is much less dense than sand, is more spherical, and has a polymer coating.

The results of the column tests are shown in Table C.

TABLE C

| | Strengths of Various Glass Fiber/Proppant Packs | | |
|---|---|---|---|
| Fiber Level St. % sand | "CARBOLITE" | "SB ULTRA" | "ISOPAC" |
| 1% | >225 kPa | >250 kPa | 55 kPa |
| 1.6% | >250 kPa | | >250 kPa |

Examples 13 and 34 illustrate that the coating and sphericity of the proppant d6 not affect the ability of the fiber to strengthen the pack. Low density proppants ("ISOPAC") may require greater amounts of fiber for pack strength.

EXAMPLE 35

The procedure of Example 31 was repeated except that the pack was made in such a way that the half of the perforation model closest to the perforation hole was filled with an identical sand/fiber mixture while the back half of the perforation was filed with sand. The pack was tested in the same way. No sand was produced.

Packing and flowing water through the above worked well, and no sand production was encountered even over ½" hole.

Examples 31 through 33 illustrate that different types of fibers may be used to hold sand in place in the formation beyond the perforation tunnels. This is applicable to gravel packing, where gravel is placed outside of the perforations to stabilize subterranean formation sands.

EXAMPLE 34

Stabilization of Different Types of Proppant:

Column experiments were performed using the fluid composition (30 lb/1000 gallon guar solution), and procedure as in Example 13. 50 ml aliquots of fluid were mixed with 100 grams each of various proppants and 1 gram (or 1.6 grams) each of 12 mm long, 16b micron diameter glass fibers. The proppants were 20/40 "CARBOLITE™", 20/40 "ACFRAC SB ULTRA™" curable resin coated sand, and 20/40 "ISOPAC™" light weight gravel. The "CARBOLITE" proppant has approximately the same density as sand, but is more spherical. The "SB ULTRA" has approximately the same density and sphericity as sand, but has a polymer coating. The "ISOPAC" lightweight gravel is much less dense than sand, is more spherical, and has a polymer coating.

The results of the column tests are shown in Table C.

TABLE C

Strengths of Various Glass Fiber/Proppant Packs

| Fiber Level St. % sand | "CARBOLITE" | "SB ULTRA" | "ISOPAC" |
|---|---|---|---|
| 1% | >225 kPa | >250 kPa | 55 kPa |
| 1.6% | >250 kPa | | >250 kPa |

Examples 13 and 34 illustrate that the coating and sphericity of the proppant do not affect the ability of the fiber to strengthen the pack. Low density proppants ("ISOPAC") may require greater amounts of fiber for pack 15 strength.

EXAMPLE 35

The procedure of Example 31 was repeated except that the pack was made in such a way that the half of the perforation model closest to the perforation hole was filled with an identical sand/fiber mixture while the back half of the perforation was filed with sand. The pack was tested in the same way. No sand was produced. Example 35 demonstrates that the proppant/fiber slurry may be used as a tail-in during the final stages of the procedure, or may be pumped in stages between slugs of proppant slurry.

EXAMPLE 36

Proppant/fiber pack strength tests were performed in a rectangular cell with inside dimensions of 12.7 cm long, 3.8 cm wide, and 2.5 cm thick. The cell was open at both ends. A perforation type geometry was set up in the cell by creating a restriction 0.63 cm on all inside dimensions. The cell was set up with a screen at the outlet. A slurry containing 500 ml of 30 lb/1000 gallon guar solution in water (composition in Example 1), 500 grams or 20/40 sand, and water (composition in Example 1), 500 grams of 20/40 sand, and 1.25 grams of 7 micron by 0.63 cm carbon fiber was pumped into the cell and formed a pack against the exit screen. The guar was washed from the pack and then the screen was removed from the exit port. A closure stress of 500 psi was applied to the face of the pack. Water was flowed from the inlet to outlet through the length of the pack. The proppant and carbon fiber pack resisted the flow of water up to 35 kPa (about 5 psi) before the pack filed and flowed through the restriction.

EXAMPLE 37

The same test as above was performed by 5 grams of AR grade glass fibers (20 micron diameter, 1.27 cm long) were added to the sand and carbon fiber slurry. The resulting pack held a drawdown of 135 kPa (about 18 psi) without failing.

EXAMPLE 38

The same test as above was performed with a slurry of 500 ml 30 lb/1000 gallon guar solution, 500 grams 20/40 sand, and 5 grams AR grade glass fibers (20 micron diameter, 1.27 cm long). The pack failed at a drawdown of 36 kPa (5 psi).

EXAMPLE 39

The same test as above was performed with a slurry of 500 ml 30 lb/1000 gallon guar solution, and 50 grams 20/40 sand without fiber added. The pack failed immediately with the onset of water flow, and no measurable pressure drop was maintained across the pack.

Examples 36–39 show that carbon fibers can be used to stabilize the pack and that mixtures of fiber can result in stronger packs than a single fiber type.

EXAMPLE 40

Proppant fiber pack strength tests were performed in a disk shaped cell. The diameter of the disk is 15.2 cm, and the thickness is 1.2+/-0.05 cm. the cell has inlet and output openings 10.2 cm across. A screen was placed across the outlet. A slurry containing 1000 ml of 50 lb/1000 gallon guar solution, 1000 grams of proppant, 15 grams of AR glass fibers (20 micron diameter, 12.7 mm long) was pumped into the cell and formed a pack against the screen. In each test the proppant size was varied. The guar was washed from the pack, and then the screen was removed. Closure stress of 1000 psi was applied to the faces of the disk. The excess pack was cleaned from the cell, so that the pack was perpendicular to the flow direction from inlet and outlet. This resulted in a pack length from inlet to outlet of 11.4 cm. Water was then flowed through the pack Until it failed and proppant flowed out of the cell. This coincided with a relaxation of the closure stress.

| PROPPANT | PACK STRENGTH |
|---|---|
| 20/40 | 60 kPa (8.5 psi) |
| 12/20 | 21 kPa (3 psi) |
| 16/30 | 21 kPa (3 psi) |

The same procedure was followed as in example 40 except that no fiber was added to the 20/40 sand pack. The pack failed at the onset of water follow and no pressure drawdown was maintained.

The results show that the fibers will strengthen different proppant sizes.

EXAMPLE 41

500 ml of a 50 pound per 1000 gallon borate crosslinked guar gel were prepared. The gel contained 3 grams guar, 10 grams potassium chloride 0.5 ml surfactant, 0.25 ml bactericide, 0.125 ml antifoam agent, 0.5 ml stabilizer (iron control), 0.6 grams oxygen scavenger, 0.6 grams boric acid, 1.5 grams sodium hydroxide, and 3 grams sodium gluconate. 500 grams of 20/40 US mesh brady sand and 7.5 grams AR grade glass fiber (20 microns diameter, 12.7 mm length) were mixed into the gel.

The resulting slurry was poured into a metal tube 22.1 mm inside diameter, and 127 mm in length. The ends of the tube were capped, and it was then heated to 150° C. for 24 hours.

These conditions were sufficient to "break" the gel. The tube was cooled, opened and a washer with 12.7 mm hole was fitted into one end of the tube. The tube was connected to a water source such that the washer was at the outlet end of the tube. Effectively the slurry mixture was held from sliding out of the tube by the washer, but water could flow through the slurry sand pack.

The water flow was initiated at a low flow rate to wash the broken gel from the sand pack. No sand flowed out the tube with the water. The water flow rate was then increased. No sand flowed until the flow rate reached 7.6 L/min. which corresponded to 381 kPa drawdown across the pack. At this point the sand pack failed and ran out of the tubing through the washer.

EXAMPLE 42

The same experiment as above was run with the crosslinked gel and sand, but without the AR glass fibers. The sand pack flowed out of the tube through the washer at very low flow rate during the cleaning of the broken gel from the pack.

EXAMPLE 43

This example shows that the use of fibers may reduce treating pressures. During a fracturing treatment in southern Texas, concentration of 20/40 ceramic proppant was ramped up from 0 to 2 to 4 to 6 to 8 pounds proppant added (ppa) per gallon of fluid. Shortly after initiation of the 8 ppa stage the treating pressure increased from 5800 psi to more than 7500 psi. Then, 1.5% fiber was added to the slurry. The treating pressure rapidly decreased back to 5800 psi. After some time, fiber addition was stopped. Treating pressure immediately began to increase. When the pressure reached 6500 psi, addition of fibers was resumed, this time at 1% by weight of proppant. Treating pressures again declined to 5500 psi. This example demonstrates the use of fibers to reduce treating pressure during a fracturing treatment.

EXAMPLE 44

Fibers may be used to provide rapid well turnaround, reducing treating costs. Typical wells in the shale formations in Indiana contain several productive zones. Creation of one large fracture to cover all zones in a given well is not a viable solution.

Previous practice had involved fracturing each zone using resin coated proppant. At the end of each treatment, the well is shut in for 12 to 20 hours to allow the resin coated proppant to cure. The well then is allowed to flow for 30 minutes and the next zone then is fractured. In this manner it requires one week on location to fracture four zones in a well.

With the use of fibers at 1.5% by weight of proppant during the last stage of each treatment, the zone fractured may be turned around within ten minutes and then the next zone is fractured. That second zone then is produced for about 30 minutes and then the next (third) zone may be fractured, and so on. In this way, four zones in a single well were fractured in less than 8 hours on location. This results in a savings of 3–4 days of rig time on location that otherwise would be required while waiting for resin coated proppants to cure, followed by subsequent drilling out of the cured proppant in the well bore. In most cases, it requires several days on location for a power swivel and bit to drill out cured resin coated proppant. This can reduce costs by several thousand dollars per well. This example illustrates the use of fibers to allow rapid well turnaround, thereby reducing treating costs of multizone wells.

EXAMPLE 45

Creation of fingers or channels in a porous pack may dramatically increase productivity of a well as compared to standard fracturing processes. A plexiglass cell was constructed containing a 9"×3.875"×1.5" cavity. The cell was fitted with a slurry of 50lb/1000 gallon guar solution containing 16/20 sand and 1.5% glass fiber by weight of sand by plumping the slurry through the metal tube through the cell and against the screen on the opposite end. Water then was pumped through the proppant/fiber pack in the same direction to remove residual guar. Air was then pumped through the cell in the same direction to displace most of the water. An aqueous glycerol solution having a viscosity of 300 cP then was pumped through the screen into the pack and out the open tube flow rate is was increased up to 50 ml/minute without failure of the pack. This is approximately equivalent to a flow rate of about half a barrel per day of high viscosity fluid per perforation 20 in a well. As the flow rate is increased, a finger or channel begins to form in the pack. At a rate of 380 mi./minute the channel is about ½" in diameter extending the length of the cell. Flow rate can be increased to greater than 1550 ml/min without further changes in the pack. This example illustrates the very high flow rate that can be handled by this channel. This is one way to dramatically increase the productivity of a well compared to standard fracturing practices.

EXAMPLE 46

After a conventional fracturing treatment using a 15% resin coated proppant tail-in based upon total volume of proppant pumped, the well is shut in for a sufficient time for the resin coated proppant to cure. A pad of viscosified fluid is then pumped downhole at less than fracturing rated pressure. The viscosified fluid may be gelled brine or gelled oil. The viscosity of this fluid is at least 50 times greater than that of the next fluid. The next fluid is conventional mud acid containing a mutual solvent such as butyl acetate. This fluid will finger into the previous fluid in the resin coated proppant pack, dissolving the coating and allowing the proppant to be produced back from these fingers once the well is turned around. This reduces well productivity as in the Example immediately preceding this Example.

EXAMPLE 47

This example is basically the same as in the Example 46 except that the resin coated proppant tail-in if further stabilized by the addition of 1.5% fibers by weight of resin coated proppant. In this case no shut in time is needed and the acid can be pumped immediately following the viscous fracturing fluid. Or, if desired, the acid treatment may follow the procedure described in Example 46 above. In either case, high productivity channels are created in the pack.

EXAMPLE 48

The use of fibers can allow for optimization of flowback rates to maximize polymer removal from the fracture and thereby increase the productivity of a well. In Southern Texas, for example, fractures using resin coated proppant must be flowed back at relatively slow rates, typically less than 250 barrels of water per day. Otherwise, catastrophic failure of the resin coated proppant pack may occur. At this slow rate, only a very limited amount of fracturing fluid and associated polymer residues can be recovered before gas breaks through and begins to be produced from the formation. Once gas production begins, the water return rate decreases and polymer remaining in the fracture can be baked on the proppant surfaces, clogging flow channels and reducing well productivity. In one well in South Texas, for example, flowback from a resin coated proppant job was monitored. Gas broke through after about 22 hours. At that stage, less than 10% of the fracturing fluid volume had been recovered and less than 10% of the polymer pumped during the job had been returned to the surface. Less than 15% of the total polymer pumped had been returned to the surface after 50 hours of total flowback time.

In contrast, a well was fractured using fibers to control proppant flowback in this same formation. The water return rate was increased to over 2000 bbl of water per day without failure of the pack. Gas broke through after only 8 hours, but by that time more than 15% of the polymer pumped already had been recovered. After 50 hours, 25% of the polymer pumped during the fracture treatment had been returned to the surface. That is nearly twice the clean up efficiency of resin coated proppant fracturing treatments.

In neighboring formations, polymer return rates in excess of fifty percent have been recovered after 50 hours of flowback time.

This Example illustrate that use of fibers can allow optimization of the flowback rates to maximize polymer removal from the fracture and thereby increase the productivity of the well.

The invention has been described in the more limited aspects of preferred embodiments hereof, including numerous examples. Other embodiments have been suggested and still others may occur to those skilled in the art upon a reading and understanding of the this specification. It is intended that all such embodiments be included within the scope of this invention.

We claim:

1. A method of treating an underground formation penetrated by a wellbore using a fluid suspension, comprising the steps of:

(a) providing a fluid suspension, said suspension comprised of a fluid, a particulate material, and a solid material, the solid material being selected from the group of solid materials consisting of metal, polymers, ceramics and glass;

(b) pumping the fluid suspension downhole through a wellbore;

(c) depositing the fluid suspension in the formation;

(d) flowing back fluid from the formation, thereby forming a matrix of solid material and particulate material; and (e) reducing migration of particulate material from the matrix into the wellbore.

2. A method of treating an underground formation penetrated by a wellbore using a fluid suspension, comprising the steps of:

(a) providing a fluid suspension, said suspension comprised of a fluid, a particulate material and shavings of solid polymer material;

(b) pumping the fluid suspension downhole through a wellbore;

(c) depositing the fluid suspension in the formation;

(d) flowing back fluid from the formation, thereby forming a matrix of shavings of solid polymer material and particulate material; and (e) reducing migration of particulate material from the matrix into the wellbore.

3. A method of treating an underground formation penetrated by a wellbore using a fluid suspension, comprising the steps of:

(a) providing a fluid suspension, said suspension comprised of a fluid, a proppant, and solid particles, the solid particles selected from the group of particles consisting of metal, polymers, ceramics, and glass;

(b) pumping the fluid suspension downhole through a wellbore;

(c) depositing the fluid suspension in the formation;

(d) flowing back fluid from the formation, thereby forming a matrix of solid particles and proppant; and (e) reducing migration of proppant from the matrix into the wellbore.

4. A method of treating an underground formation penetrated by a wellbore using a fluid suspension, comprising the steps of:

(a) providing a fluid suspension, said suspension comprised of a fluid, a particulate material, and particles of polymeric material, (b) pumping the fluid suspension downhole through a wellbore;

(c) depositing the fluid suspension in the formation;

(d) flowing back fluid from the formation, thereby forming a matrix of particles of polymeric material and particulate material; and (e) reducing migration of particulate material from the matrix into the wellbore.

5. A method of reducing the production of proppant from a well after fracturing a subterranean formation penetrated by the well, comprising:

(a) pumping a fluid from the surface of the ground through a wellbore and into a subterranean formation, the fluid comprising a viscous liquid, proppant, and shavings or discs of polymer material, (b) forming a matrix within the subterranean formation, the matrix comprising the proppant and polymer material in close association with each other, and (c) reducing production of the proppant from the well.

6. The method of claim 5 additionally comprising the step of flowing back fluid from the subterranean formation.

7. The method of claim 6 additionally comprising the step of removing proppant from a region of the matrix, thereby forming a channel in the matrix.

8. The method of claim 7 wherein the step removing is accomplished by increasing the rate of well flowback, thereby creating a channel in the matrix.

9. The method of claim 7 wherein the step of removing is accomplished by treating with acid following formation of the matrix.

10. A method of inhibiting flowback of propping agent from a subterranean formation into a wellbore with reduced energy consumption comprising the steps of:

(a) providing a fluid suspension comprising a mixture of a propping agent and fibers;

(b) pumping the fluid suspension including a mixture of the propping agent and fibers through the wellbore using reduced amounts of energy; and (c) depositing the mixture of propping agent and fibers in the subterranean formation.

11. The method as set forth in claim 10 wherein the step of pumping is carried out at a pressure in excess of fracturing pressure for the subterranean formation, further wherein the step of depositing comprises placing the propping agent and fiber in fractures created in the formation during the step of pumping.

12. The method of claim 11 further wherein the step of pumping comprises pumping the mixture of propping agent and fibers together with a fluid in a tubular such that frictional forces are reduced, thereby saving energy.

13. A method of treating an underground formation penetrated by a wellbore using a suspension, comprising the steps of:

(a) providing a suspension, said suspension comprised of a fluid, a particulate material, and solid shavings of material;

(b) pumping the suspension downhole through a wellbore into a formation;

(c) depositing the suspension in the formation;

(d) flowing back fluid from the formation;

(e) forming a porous pack comprised of solid shavings of material and particulate material, further wherein a channel is formed in the porous pack; and (f) wherein the channel is formed by using acid to remove the solid shavings of material from the porous pack.

14. The method of claim 13 wherein the solid shavings of material are selected from a group of materials comprising metal, polymers, ceramics, and glass.

* * * * *